United States Patent
Lehner

(10) Patent No.: US 11,886,163 B2
(45) Date of Patent: Jan. 30, 2024

(54) METHOD FOR OPERATING A MACHINE CONTROL SYSTEM, AND MACHINE CONTROL SYSTEM

(71) Applicant: KEBA Industrial Automation GmbH, Linz (AT)

(72) Inventor: Bernhard Lehner, Hirschbach (AT)

(73) Assignee: KEBA Industrial Automation Gmbh, Linz (AT)

( * ) Notice: Subject to any disclaimer, the term of this patent is extended or adjusted under 35 U.S.C. 154(b) by 301 days.

(21) Appl. No.: 17/288,587

(22) PCT Filed: Oct. 28, 2019

(86) PCT No.: PCT/AT2019/060356
§ 371 (c)(1),
(2) Date: Apr. 26, 2021

(87) PCT Pub. No.: WO2020/087098
PCT Pub. Date: May 7, 2020

(65) Prior Publication Data
US 2021/0397153 A1 Dec. 23, 2021

(30) Foreign Application Priority Data

Oct. 31, 2018 (AT) .............................. A 50938/2018

(51) Int. Cl.
*G05B 19/406* (2006.01)
*B25J 19/06* (2006.01)
*G05B 19/409* (2006.01)

(52) U.S. Cl.
CPC ............ *G05B 19/406* (2013.01); *B25J 19/06* (2013.01); *G05B 19/409* (2013.01);
(Continued)

(58) Field of Classification Search
CPC ................ G05B 19/406; G05B 19/409; G05B 2219/32128; G05B 2219/37095;
(Continued)

(56) References Cited

U.S. PATENT DOCUMENTS 8,688,244 B2   4/2014   Kalhoff et al.
10,649,431 B2  5/2020   Huettner et al.
(Continued)

FOREIGN PATENT DOCUMENTS

AT    006 728 U1    3/2004
CN   102939188 A    2/2013
(Continued)

OTHER PUBLICATIONS

International Search Report in PCT/AT2019/060356, dated Mar. 12, 2020.

*Primary Examiner* — Christopher E. Everett
(74) *Attorney, Agent, or Firm* — Collard & Roe, P.C.

(57) ABSTRACT

A method for operating a machine control system and a corresponding machine control system uses a portable hand-held terminal for functionally influencing at least one machine controller. The terminal includes at least one emergency stop actuation element for terminating potentially dangerous machine operations. The controller and/or the terminal is adapted for indicating a representation of the control system on the terminal display. The controller and/or the hand-held terminal is adapted for indicating the operational range(s) of the at least one emergency stop actuation element by the terminal display. The controller and/or the hand-held terminal are further adapted for simultaneously representing the operational range(s) of the at least one emergency stop actuation element by selective, fail-safe controlling of at least one lighting device at the hand-held terminal and/or at least one discrete lighting device in or at the at least one emergency stop actuation element at the hand-held terminal.

16 Claims, 2 Drawing Sheets

Figure 1:
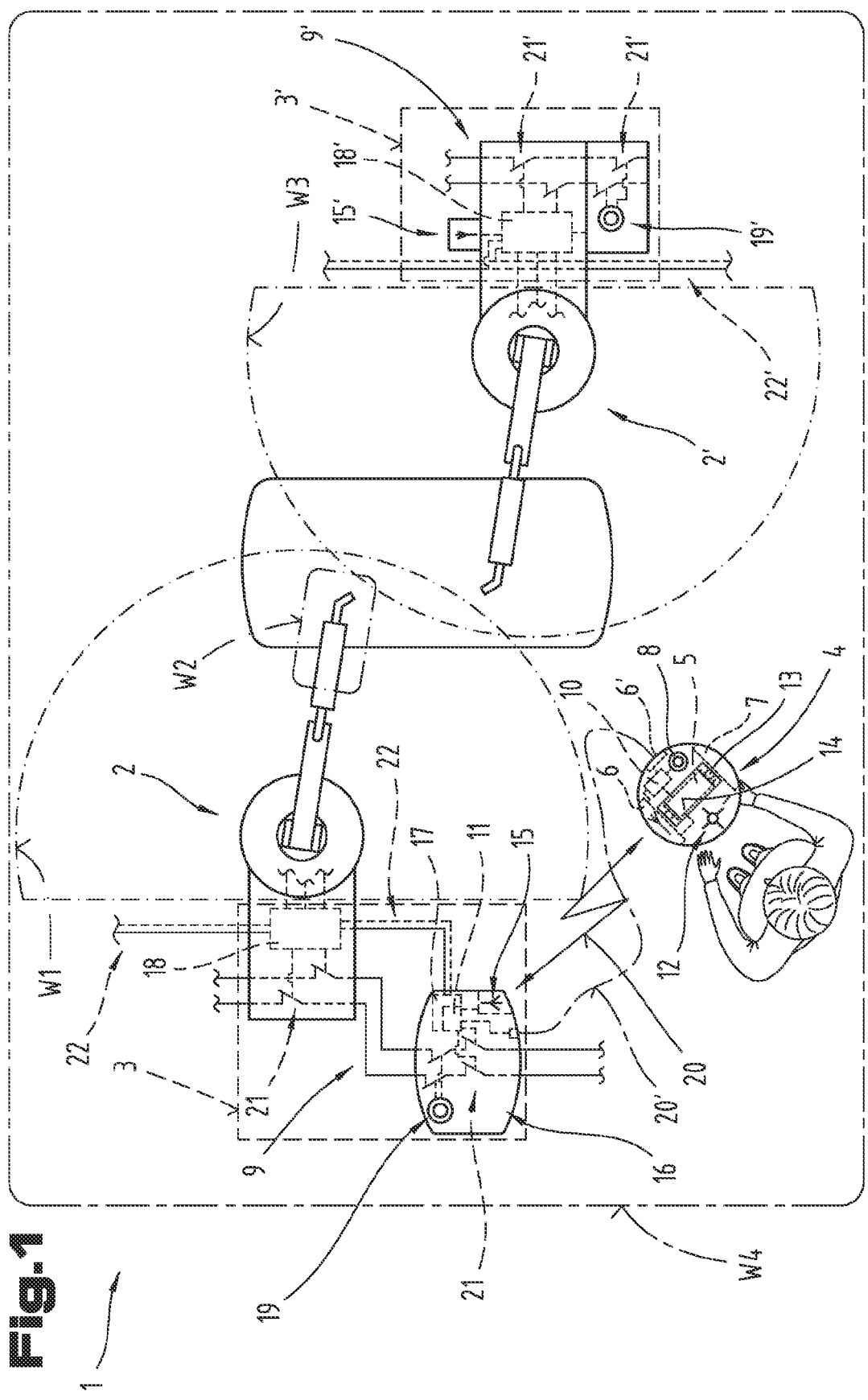

(52) U.S. Cl.
CPC ............. *G05B 2219/32128* (2013.01); *G05B 2219/37095* (2013.01); *G05B 2219/50198* (2013.01)

(58) Field of Classification Search
CPC .......... G05B 2219/50198; G05B 2219/36162; G05B 2219/39447; G05B 2219/40478; G05B 9/02; G05B 19/042; G05B 19/418; B25J 19/06; B25J 9/1656; B25J 9/1676; B25J 13/00; F16P 3/12; H04W 4/029
See application file for complete search history.

(56) References Cited

U.S. PATENT DOCUMENTS

| | | | |
|---|---|---|---|
| 10,895,860 B2 | 1/2021 | Fischer | |
| 2006/0097860 A1* | 5/2006 | Halfmann | G05B 9/02 702/182 |
| 2009/0248223 A1* | 10/2009 | Ecton | B61L 3/127 701/2 |
| 2016/0379482 A1* | 12/2016 | Saito | G06F 1/26 340/12.5 |
| 2017/0031339 A1* | 2/2017 | Corbeil | G06Q 50/08 |
| 2018/0136631 A1 | 5/2018 | Takahashi | |
| 2018/0157239 A1* | 6/2018 | Bordegnoni | G05B 9/02 |
| 2019/0004489 A1* | 1/2019 | Stagg | G05B 19/048 |

FOREIGN PATENT DOCUMENTS

| | | |
|---|---|---|
| CN | 205766190 U | 12/2016 |
| EP | 1 890 210 A1 | 2/2008 |
| EP | 2 048 557 A1 | 4/2009 |
| EP | 3 182 236 A1 | 6/2017 |
| WO | 2007/054435 A1 | 5/2007 |
| WO | 2008/064381 A2 | 6/2008 |
| WO | 2017/076765 A1 | 5/2017 |
| WO | 2018/039692 A1 | 3/2018 |

\* cited by examiner

METHOD FOR OPERATING A MACHINE CONTROL SYSTEM, AND MACHINE CONTROL SYSTEM

CROSS REFERENCE TO RELATED APPLICATIONS

This application is the National Stage of PCT/AT2019/060356 filed on Oct. 28, 2019, which claims priority under 35 U.S.C. § 119 of Austrian Application No. A 50938/2018 filed on Oct. 31, 2018, the disclosure of which is incorporated by reference. The international application under PCT article 21(2) was not published in English.

The invention relates to a method for operating a machine control system having at least one machine controller for performing machine operations. The machine control system comprises at least one mobile hand-held terminal, which is portable by an operator and provided for functionally influencing at least one of the machine controllers, which hand-held terminal has at least one operating element for manually influencing machine operations and at least one user interface having a display for monitoring or controlling the machine operations by an operator, and which hand-held terminal comprises at least one emergency stop actuation element for terminating potentially dangerous machine operations, wherein the respectively present actuation states of the at least one emergency stop actuation element, which actuation states may be manually activated or changed by an operator, are coupled via at least one transmission interface into an emergency stop safety circuit or into a safety bus system of the selected or actively connected machine controller. The invention further relates to a corresponding machine control system.

A generic machine control system is known, for example, from WO2018/039692A1, which originates from the applicant. In this regard, a check is carried out by means of a data-related identifier of the hand-held terminal as to whether or how the hand-held terminal may be coupled with the respective machine controller via a control mechanism. By means of this at least partially automated compatibility check, achievable user convenience and safety of the control system may be increased. Due to errors or mishandling on part of the user, however, critical situations cannot be completely ruled out.

EP1890210A1 describes a machine control system where the current operating state of operating elements provided for controlling a processing system is marked in a flexible manner. In this regard, an active and a passive operating state of the at least one operating element of a control device is marked, wherein in the active operating state of the operating element, a process function of an area of the processing system is controlled. For this purpose, the control device is connected to the processing system, the operating element is functionally associated with the processing system, and the operating state of the operating element is marked as active after it has been successfully associated. The respective association may be carried out by means of markings in different colors. Colored light sources positioned directly at the respective machines or processing areas ensure that the respective association between an operating element and a machine is apparent.

It has been the object of the present invention to overcome the disadvantages of the prior art and to provide a method and a device by means of which control of machines and operation of a machine control system may be safer and at the same time as user-convenient as possible.

This object is achieved by a method and a device according to the claims.

The method according to the invention for operating a machine control system comprises the following steps:
schematically representing the machine control system or portions of the machine control system on the display of the hand-held terminal;
schematically representing the effective operational range(s) of the at least one emergency stop actuation element at the hand-held terminal by means of the display of the hand-held terminal and additionally by means of selective, preferably fail-safe controlling of at least one lighting means at the hand-held terminal, which at least one lighting means may, for example, be positioned in the peripheral region or in an edge region of the display, and/or by preferably fail-safe controlling of at least one discrete lighting means in or at the at least one emergency stop actuation element at the hand-held terminal.

An advantage of the measures according to the invention is that potentially safety-critical situations caused by an error or due to unstable memory of an operator may be prevented. In particular, by means of the measures according to the invention, it is possible to clearly indicate to an operator which operational range(s) of the machine control system the availability of the emergency stop actuation element at the mobile hand-held terminal is limited to. This is of particular significance especially in the case of hand-held terminals with a large radius of action or a relatively long cable connection, or in the case of hand-held terminals that are completely wirelessly couplable or coupled with the machine control system. However, also incorrect assessment of the effectiveness or the applicable emergency stop operational ranges of the emergency stop actuation element at the hand-held terminal may also occur due to errors, forgetfulness or change of the operator in charge; however, these problem situations may now be minimized or prevented by the measures according to the invention. Moreover, by selectively controlling or activating the at least one lighting means at the hand-held terminal, particularly unmistakable signaling of the emergency stop operational range(s) may be achieved. In this regard, the at least one lighting means may be formed discretely, for example in the form of multiple LEDs. However, the at least one lighting means may also be formed as an integral component, for example in the form of a 7-segment display or in the form of a dot-matrix display with a plurality of grouped lighting means.

In addition, any discrepancies between the visual information of the display and the visual information of the at least one lighting means may be immediately noticed by the operator and indicate an implausible state or a possible malfunction in the machine control system. Indication of the emergency stop operational range(s) by means of the display and indication of the emergency stop operational range(s) by means of the at least one lighting means is preferably carried out simultaneously or jointly. The operator may thus act as an additional human monitoring entity as it is possible to compare quickly and unambiguously whether the double information on the emergency stop operational range, which information content is usually indicated identically by the display and the lighting means, matches.

It is further advantageous that selective control of the lighting means at the hand-held terminal, in particular the corresponding activation or deactivation of the respective lighting means, is performed in a fail-safe manner. In particular, higher requirements with regard to reliability and function may thus be met as the probability of a wrong indication of the applicable emergency stop operational ranges is basically zero and any resulting safety risks may be eliminated or minimized.

It may further be appropriate if for signaling the operational range(s) of the at least one emergency stop actuation element, fail-safe activation of that/those lighting means is carried out which lighting means identifies that portion of the machine control system or which lighting means identify those portions of the machine control system for which portion(s) the emergency stop actuation element is functionally available, in particular ready for use. This way, it may be indicated as unambiguously as possible to the operator, in particular clearly highlighted or marked, with respect to which "shutdown regions" or operational zones the emergency stop actuation element may become operative if required.

It may further be provided that for signaling the operational range(s) of the at least one emergency stop actuation element, that portion of the machine control system may be graphically marked and/or highlighted in color or those portions of the machine control system may be graphically marked and/or highlighted in color on the display of the hand-held terminal for which portion(s) the emergency stop actuation element is functionally available, i.e. ready for use, and/or that the discrete lighting means in or at the at least one emergency stop actuation element is activated if the at least one emergency stop actuation element at the hand-held terminal is functionally available. Consequently, the emergency stop actuation element is illuminated or back-lit if it is available or ready for use. Alternatively or in combination, those lighting means may be active which signal the functionally available operational range(s) of the emergency stop actuation element at the hand-held terminal.

In addition, it may be provided that on the display of the hand-held terminal, the respectively applicable stopping category is additionally indicated by the at least one emergency stop actuation element, i.e. category 0 for immediate interruption of the energy supply with respect to the at least one machine operation, or category 1 for stopping movements or functions with respect to the at least one machine operation and subsequent interruption of the energy supply.

This may be relevant for trained operators. In particular, the respective functionality of the emergency stop actuation element at the hand-held terminal may thus be distinguished by trained operations, such as machine programmers.

An embodiment is also advantageous according to which a manually operable and/or automatically operating mode switching means is provided, by means of which a manually initiated or automatically executed change between a (i) stationary operating mode of the handheld terminal and a (ii) machine influencing mode of the hand-held terminal, in particularly a so-called teach mode, and vice versa, is carried out.

According to a further development, it is possible that the at least one emergency stop actuation element at the hand-held terminal is operated or provided in the (i) stationary operating mode of the hand-held terminal as an emergency stop function element for immediate interruption of the energy supply with respect to the at least one machine operation and that the at least one emergency stop actuation element at the hand-held terminal is operated or provided in the (ii) machine influencing mode of the hand-held terminal for stopping movements or functions with respect to the at least one machine operation and for subsequent interruption of the energy supply.

It may further be appropriate if an appearance which is colored red at least in sections is assigned to the at least one emergency stop actuation element in the (i) stationary operating mode of the hand-held terminal by activating the at least one lighting means, whereas the at least one lighting means is deactivated in the (ii) machine influencing mode. In the machine influencing mode, the emergency stop actuation element preferably does not have any red-colored portions but has a gray or a gray and yellow appearance, in particular a milky-gray transparent and yellow appearance. With this controlled color change of the emergency stop actuation element, its respectively applicable stopping category, in particular 0 or 1, may be unambiguously indicated.

It may further be provided that the mode switching means is influenced by interaction of the operator with at least one button at the hand-held terminal. This way, a manual switching option, which may be secured by an authorization verification means if necessary, between the two operating modes is created.

It may further be provided that the mode switching means is automatically influenced by depositing the hand-held terminal at a predefined location or by a predefined assignment to and/or attachment at a predefined counterpart, such as a wall mount. This way, automatic switching between the two operating modes or automatic activation of the stationary operating mode may be achieved.

According to a special embodiment, the at least one transmission interface of the hand-held terminal is wireless, wherein the at least one wireless transmission interface is adapted for wirelessly establishing or implementing a control-related operative connection between the hand-held terminal and at least one of the machine controllers. Where appropriate, the wireless operative connection may also be established towards a dedicated connecting point or connecting box of one of the machine controllers.

According to an advantageous further development, it may be provided that the respectively present actuation states of the at least one emergency stop actuation element, which actuation states may be manually activated or changed by an operator, are signaled via the at least one wireless transmission interface and coupled into the emergency stop safety circuit or into the safety bus system of the selected or actively connected machine controller, so that in an active operating state of the hand-held terminal, the at least one emergency stop actuation element may be coupled into the emergency stop safety circuit or into the safety bus system of the selected or actively connected machine controller in terms of function.

In particular, it may be advantageous if the at least one lighting means at the hand-held terminal and/or the at least one discrete lighting means in or at the at least one emergency stop actuation element of the hand-held terminal is controlled by an electronic safety module arranged in the hand-held terminal, for example in the form of a safety controller.

It may further be provided that the function according to plan, in particular the active and/or inactive state, of the at least one lighting means is checked by means of the safety module and at least one sensor connected thereto, and a possible error state is signaled. Such signaling may, for example, be performed at the hand-held terminal and thus be immediately brought to the attention of the operator.

It may further be provided that at least individual ones or all lighting means are formed by at least one 7-segment display in the peripheral or edge region of the display and/or at the emergency stop actuation element.

The object of the invention is also achieved by a machine control system as indicated in the claims. The technical and advantageous effects that may be achieved with it may be gathered from the above parts of the description and also from the following statements.

For better understanding of the invention, the latter is explained in detail with reference to the following figures.

Figure 2:
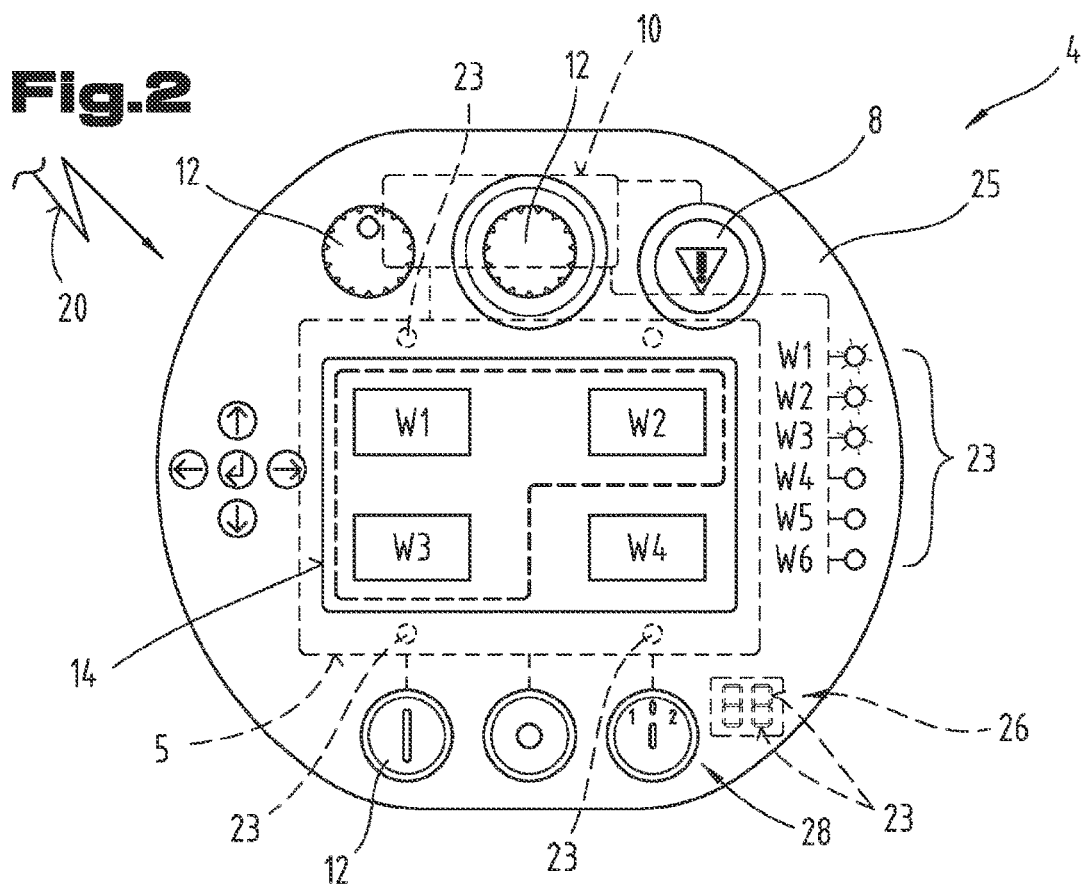
Figure 3:
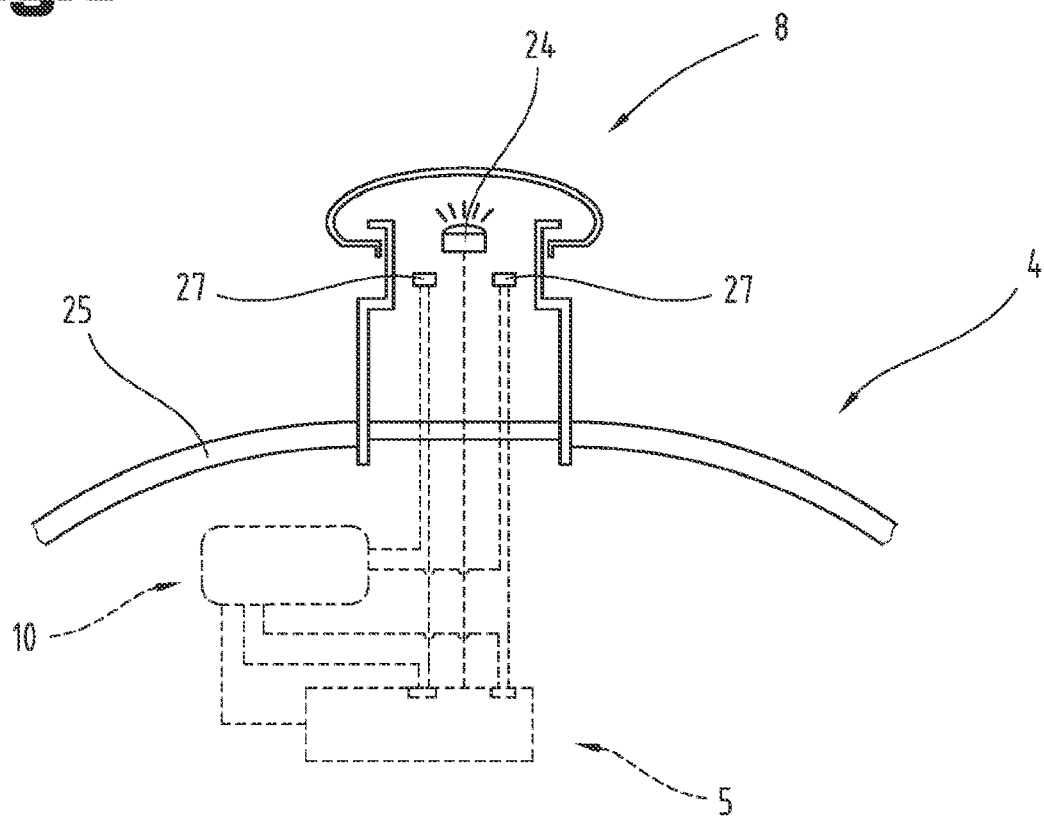

The following is shown in highly simplified, schematic representation:

FIG. 1 a scheme of an exemplary machine control system comprising machines, in particular industrial robots, which may be controlled either manually or automatically;

FIG. 2 a portable hand-held terminal, which may be utilized in the machine control system according to FIG. 1;

FIG. 3 an emergency stop actuation element with an automatically activatable or deactivatable lighting or backlighting for signaling its functional availability or non-availability.

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure shown and described, and, if a position changes, said position indications are to be correspondingly applied to the new position.

FIG. 1 shows an embodiment of a machine control system 1 for performing production or processing procedures manually, partially automatically or fully automatically. In this regard, the corresponding machines 2, 2' are formed by a group of industrial robots. The machines controlled by a control mechanism may, however, also be formed by other processing machines or machine tools.

The corresponding machines 2, 2' each comprise at least one electronic machine controller 3, 3', via which the respective actuators or drives of the associated machine 2, 2' may be controlled or activated, and which machine controllers 3, 3' are connected to a plurality of sensors or detectors for detecting or monitoring the respective operating or machine states. The machine controllers 3, 3', which are known per se, are preferably program-controlled, in particular operable by software.

At least one mobile hand-held terminal 4, which is in particular portable by an operator, is integrated or integratable into the machine control system 1 via a control mechanism. The handheld terminal 4 comprises at least one electronic control device 5, which may be selectively set into interaction with the local machine controllers 3, 3' or is communication-compatible with them. In this regard, for communication with at least one of the local machine controllers 3, 3' by means of a data connection or a control mechanism, at least one transmission interface 6, which is provided via radio, for example, is formed at the hand-held terminal 4 or its control device 5. In this regard, the hand-held terminal 4 is preferably completely wireless, i.e. operable without any kind of cable connection. For electrical energy supply of the electrical components of the hand-held device 4, the latter comprises at least one battery or at least one rechargeable storage battery 7.

In the alternative, it is also possible that the hand-held terminal 4 or its at least one transmission interface 6' is wired or cable-connected. As is known per se, the hand-held terminal 4 is then connectable or connected to at least one of the machine controllers 3, 3' by means of a cable connection 20'—illustrated with a dash-dotted line in FIG. 1—via a data connection or a control mechanism. For this purpose, connector interfaces, which are known per se, may be formed on side of the machine controller 3, 3' and/or on the side of the hand-held terminal 4.

It is also possible to provide a combinational connection of the hand-held terminal 4 to the machine controller 3, 3'. Data or signals which are not safety-critical are then exchanged or transmitted by means of the radio-based transmission interface 6. However, data or signals which are comparatively safety-critical and relate, for example, to an emergency stop actuation element 8 at the hand-held terminal 4, are exchanged or transmitted by means of the wired transmission interface 6'.

At the hand-held terminal 4, at least one emergency stop actuation element 8 is formed, which enables an operator to avert or directly terminate potentially dangerous situations in the course of automated or partially automated machine operations. In particular, by actuating or activating the emergency stop actuation element 8, a safe state may be initiated, or potentially dangerous machine operations may be directly and comprehensively terminated. In this regard, the emergency stop actuation element 8 acts upon an emergency stop safety circuit 9 or 9' of the respectively controlled or connected machine 2 or 2'. If necessary, the emergency stop actuation element 8 may also act upon the entire machine control system 1. Alternatively or in combination, the respective actuation states, in particular a manually induced active or inactive state of the at least one emergency stop actuation element 8 at the hand-held terminal 4 may also be coupled or fed via a data connection into a safety bus system 22, 22' of the respective machine controller 3, 3' or of the respective machine 2, 2' or machine group, as will be described below.

According to an advantageous "wireless embodiment" of the hand-held terminal 4, the emergency stop actuation element 8 is, via the at least one radio-based transmission interface 6 at the hand-held terminal 4, wirelessly integrated in the machine control system 1 or operatively connected via radio to the respectively selected and actively connected machine controller 3, 3', in particular functionally coupled to the respective emergency stop safety circuit 9, 9' or the respective safety bus system 22, 22'. In this regard, the emergency stop actuation element 8 and the respective emergency stop safety circuit 9, 9' or safety bus system 22, 22' are coupled in terms of effect such that high availability requirements are met and high functional reliability is considered. For this purpose, in the hand-held terminal 4, an electronic safety module 10 may be implemented, which, in interaction with an electronic safety evaluation module 11 on the side of the local machine controller 3, 3', ensures particularly functionally reliable and highly available evaluation and transmission of the respective actuation states of the first emergency stop actuation element 8 at the portable, wirelessly connected hand-held terminal 4. The emergency stop actuation element 8, which is thus mobile and directly assigned to a particular person, is thus particularly quickly available or immediately activatable if required.

Departing from the embodiment shown in FIG. 1 where the emergency stop actuation element 8 is attached at the housing of the hand-held terminal 4, it is also possible to form said emergency stop actuation element 8 or an additional emergency stop actuation element as a separate component and to couple it with the hand-held terminal 4 or its control device 5 via a cable connection or a radio connection for signaling. The same may apply to one or multiple enabling switches that may be provided. Due to their handy and compact design, such structurally separate components are colloquially also referred to as "consent or emergency stop bone" [in German].

The hand-held terminal 4 further comprises at least one operating element 12, for example a joystick, a rotary adjuster actuation element or the like, and/or at least one button 13 for manually influencing machine operations by an operator. In particular, by means of the at least one operating element 12 or the at least one button 13, an operator may perform or initiate potentially dangerous machine operations, such as motion control commands, activations of machine processes and the like. In this regard, the at least one button 13 may be formed as an electric momentary switch element or switch element and/or be formed by a touch-sensitive section on a touch-sensitive display 14 of the hand-held terminal 4.

For establishing a control-related operative connection or a data-related interaction between the hand-held terminal 4, which is entirely wireless or may also be partially wired to provide safety functions, and one of the machine controllers 3, 3', at least one communication-compatible radio counterpart 15, 15' is provided at the respective machine controller 3, 3'. For example, the radio counterpart 15 is configured as a structurally separate connecting box 16 with integrated control electronics 17, which control electronics 17 are operatively connected or line-connected to the primary control core 18 of the machine 2 or to the machine controller 3. Providing a structurally separate connecting box 16 has the advantage that existing machine systems may be upgraded this way or that an optional extension to a wireless communication system is possible.

The connecting box 16 preferably comprises at least one further emergency stop actuation element 19, by means of which potentially dangerous machine operations may be stopped immediately as well or by means of which a safe state may be initiated or achieved for the operator and for other persons in the environment of the machine control system 1. For this purpose, at least one further emergency stop actuation element 19 is integrated in the emergency stop safety circuit 9 or in the safety bus system 22 either functionally or by means of a signaling mechanism, preferably permanently wired to the emergency stop safety circuit 9. The safety evaluation module 11, which was described above and is realized in the form of particularly functionally reliable technology, may be implemented in the connecting box 16, in particular as a functional component of the internal control electronics 17.

As has been shown with reference to the machine controller 3', the radio counterpart 15' may also be configured as an integral or directly associated component of the control core 18'. Likewise, it is also possible that the at least one further emergency stop actuation element 19' is directly integrated in the emergency stop safety circuit 9' of the machine controller 3' in the environment of the machine 2', in particular directly wired to the emergency stop safety circuit 9'. Alternatively, it may also be integrated into the safety bus system 22' via a signaling mechanism or a data connection. An analogous arrangement may also be provided for the emergency stop actuation element 19 at the connecting box 16 and the emergency stop safety circuit 9 of the machine controller 3.

The respectively present actuation states of the first emergency stop actuation element 8 at the hand-held terminal 4, which actuation states may be manually selected or effected by an operator, are signaled via the at least one radio or wired data or transmission interface 6, 6' and, equivalently to the state, coupled into the emergency stop safety circuit 9 or into the safety bus system 22 of the selected or functionally connected machine controller 3. Consequently, in an operating state of the hand-held terminal 4, the at least one emergency stop actuation element 8 at the hand-held terminal 4 is, from a functional point of view, coupled into the emergency stop safety circuit 9 or into the safety bus system 22 of the selected or functionally connected machine controller 3. Analogous states apply when the hand-held terminal 4 is operatively connected or functionally coupled with the machine controller 3'. In particular, the hand-held terminal 4 may be coupled either with the machine controller 3 or with the machine controller 3' via a signaling mechanism. This depends on the requirements with regard to the signaling mechanism or on the operator's preferences. In the illustrated embodiment according to FIG. 1, the hand-held terminal 4 is functionally coupled with the machine controller 3, which is shown by way of example with an operative connection 20 via radio, which is indicated with a double arrow. Accordingly, if required, the operator may initiate an emergency stop with respect to the machine controller 3 or with respect to the machine operations controlled by it. To do this, the operator actuates the emergency stop actuation element 8 at the hand-held terminal 4 or the at least one further emergency stop actuation element 19 in the environment or vicinity of the controlled machine 2.

In this regard, a manually initiated active or actuation state of the emergency stop actuation element 8 may be represented by at least one electrically interrupted or open opener contact 21, 21' in the at least single-circuit, preferably two-circuit emergency stop safety circuit 9 or 9' of the selected machine controller 3 or 3'. In contrast, an inactive or standby state, in particular an inactive switching state of the emergency stop actuation element 8 may be represented in that the at least one opener contact 21, 21' is electrically closed in the at least single-circuit, preferably two-circuit emergency stop safety circuit 9 or 9' of the selected machine controller 3 or 3'.

Instead of the discrete emergency stop safety circuits 9, 9' described above, which comprise single-channel or multi-channel wirings or line arrangements, it is also possible according to the above statements to provide at least one safety bus system 22, 22', into which the respective actuation states of the emergency stop actuation element 8 are couplable or coupled by means of a data connection. In this regard, the safety bus system 22, 22' symbolized in FIG. 1 by parallel continuous lines and dashed lines may be implemented as a special or highly reliable safety bus protocol, which is transmitted or executed on the functional or control-relevant data network of the machine control system 1 or the machine controllers 3, 3'. Said safety bus protocol may, for example, be implemented according to the FSoE standard, according to PROFIsafe, according to SafetyBUS or according to SafetyNET; any trademark rights of course remain with the respective trademark proprietors. This means that typically, only one single, physical control network exists, on which both the control-relevant and the safety-relevant data, such as the actuation states of the at least one emergency stop actuation element 8, is transmitted or exchanged. The respective safety bus system 22, 22' may thus be integrated into the standard or control-relevant bus system or control network, in particular into the so-called fieldbus of the machine controller 3, 3', by means of a particularly fail-safe or highly available bus protocol. Alternatively, the safety bus system 22, 22' may also be configured as a physically separate data or control network. To increase reliability or functional availability of the safety bus system 22, 22', the latter may also be configured in ring topology.

Especially due to the structural complexity and partially difficult manageability of interlinked or separate, closely adjacent machines 2, 2', it is sometimes difficult for the operator to quickly and unambiguously recognize or remember, especially as correctly as possible, the association in terms of control of the hand-held terminal 4 with the respective machine 2, 2' or with the respective machine controller 3, 3'. These circumstances may be critical especially in connection with a sudden dangerous situation. In such dangerous situations, the operator should be able to access the emergency stop actuation element 8 at the mobile or position-variable hand-held terminal 4 as quickly as possible and thus prevent the respective dangerous situation or stop the potentially dangerous machine operation directly or timely. Especially in the case of hand-held terminals 4 which communicate entirely wirelessly or are wirelessly connected in terms of control, the respective, potentially active association with a machine controller 3, 3' is often not obvious, or the operator may not be able to remember it exactly. However, the effectiveness of the emergency stop actuation element 8 at the hand-held terminal 4 with regard to the respective machine controller 3, 3' or with regard to the respective safety circuit 9, 9' is hence also either present or not present. In particular, since the portable or mobile hand-held terminal 4 may be connected to different machine controllers 3, 3' as required and since at least two independent emergency stop safety circuit 9, 9' or safety bus systems 22, 22' are formed, different operational ranges W1-W4 of the emergency stop actuation element 8 at the hand-held terminal 4 may occur. However, also within a machine 2, 2' or within its machine control systems 3, 3', different, i.e. separate emergency stop safety circuits may be provided for safe shutdown or for achieving a safe state of dedicated portions of the machine 2, 2'.

The problem situations described above in connection with an uncertain or even erroneously or incorrectly assumed association of the emergency stop actuation element 8 may be avoided or prevented in the best possible way. In this connection, the machine control system 1 is adapted, or the machine controllers 3, 3' and/or the control electronics 17 of the hand-held terminal 4 are adapted for indicating an at least schematic representation of the machine control system 1 or of portions of the machine control system 1 on the display 14 of the hand-held terminal 4, as shown in FIG. 2 by way of example. In this regard, a portion of the machine control system 1 refers to an individual machine 2 or 2', a machine group 2 or 2' or to partial components or sections of an individual machine 2, 2' or machine group 2, 2'. In this regard, the corresponding representation of the machine control system 1 or of portions of the machine control system 1 on the preferably graphics-enabled display 14 of the hand-held terminal 4 may be very shadowy or abstract up to photorealistic.

Moreover, the machine control system 1 or the machine controllers 3, 3' and/or the control electronics 17 and/or the control device 5 of the hand-held terminal 4 are adapted for indicating by means of the display 14 of the hand-held terminal 4 an at least schematic representation of the effective operational range(s) W1, W2, W3, W4 of the at least one emergency stop actuation element 8 at the hand-held terminal 4. Furthermore, at least one of the aforementioned components is adapted for performing selective, preferably technically fail-safe controlling of at least one lighting means 23 at the hand-held terminal 4—FIG. 2—and/or of at least one discrete lighting means 24 in or at the at least one emergency stop actuation element 8 at the hand-held terminal 4—FIG. 3. In this regard, controlling refers to activating the respective lighting means 23 and/or 24. Through such activation, the respective lighting means 23 or 24 is lit, and the operator may thus visually recognize it as switched-on or activated. In this regard, controlling of the at least one lighting means 23; 24, which controlling is preferably implemented in a technically fail-safe manner, may comprise determining the state or current situation and/or signal transmission and/or indication or signaling of the respective operational range W1-W4 in fail-safe technology. In this regard, this controlling, which is preferably executed in a fail-safe manner, may be achieved by means of software and/or hardware measures, which are known per se, and eventually ensures that one single mistake does not result in loss of safety functions or in potentially dangerous errors or states. Controlling, in particular activation or deactivation of the respective lighting means 23 and/or 24 is thus preferably executed in safe technology and therefore implemented in a particularly reliable and fail-safe manner with regard to the respective indication of the operational range(s) W1-W4 of the emergency stop actuation element 8.

According to the embodiment according to FIG. 2, the individual, for example discrete lighting means 23, which may each be associated with an operational range W1, W2, W3 or W4 or with zones or groups of operational ranges W1-W3; W2-W4 or W1-W4 and the like, may be arranged in an edge region of the display 14. Alternatively, it is also possible that the discrete lighting means 23 are arranged at the closest position to, or locally unambiguously associated with, the operational ranges W1-W4 which may be or are graphically represented on the display 14, as indicated by way of example in FIG. 2 with dashed lines.

Accordingly, for signaling the operational range W1, W2, W3 or W4 or for signaling the operational ranges W1-Wn of the at least one emergency stop actuation element 8, fail-safe activation of that lighting means 23; 24 or of those lighting means 23; 24 is carried out, which lighting means 23; 24 is associated with that portion of the machine control system 1 or which lighting means 23; 24 are associated with those portions of the machine control system 1 for which portion(s) the emergency stop actuation element 8 is functionally available, in particular ready for use. In particular, it may be indicated as unambiguously as possible this way, in particular highlighted or clearly marked for the operator, for which (one) of the basically available "shutdown regions" or shutdown zones the at least one emergency stop actuation element 8 at the hand-held terminal 4 is available and may be activated in a functionally effective manner if required. In the case of multiple lighting means 23 at the edge or peripheral region of the display 14 and the resulting clear association with portions of the system or the machine controller 1, this may be implemented relatively unambiguously and unmistakably. However, also by means of association markings, such as W1-Wn, which are provided at the hand-held terminal 4 or near the respective lighting means 23, an association may be created which is unambiguous and unmistakable for the operator.

Moreover, for signaling the operational range W1, W2, W3 or W4 or the operational ranges W1-Wn of the at least one emergency stop actuation element 8, that portion of the machine control system 1 may be graphically marked and/or highlighted in color or those portions of the machine control system 1 may be graphically marked and/or highlighted in color on the display 14 of the hand-held terminal 4 for which portion(s) the emergency stop actuation element 8 is functionally available, i.e. ready for use. Alternatively or in combination, if the at least one emergency stop actuation element 8 at the hand-held terminal 4 is functionally available, the discrete lighting means 24 in or at the at least one emergency stop actuation element 8 may be control-activated. Consequently, the emergency stop actuation element 8 is automatically illuminated or its lighting means 24 is automatically activated if the emergency stop actuation element 8 at the hand-held terminal 4 is actually available or ready for use with high reliability.

The respective lighting means 23; 24 may be defined by discrete LEDs positioned at the housing 25 of the hand-held terminal 4. Alternatively or in combination, it is also possible to position at least individual ones or all lighting means 23 in the peripheral or edge region of the display 14 through at least one 7-segment display 26 for displaying numbers—see, for example, the illustration in dashed lines in FIG. 2—and/or to provide at least one 7-segment display 26 for displaying numbers at the emergency stop actuation element 8.

The marking of the respective operational range(s) W1-Wn of the emergency stop actuation element 8, which marking is preferably graphical and clearly visible to the operator, may be achieved through symbolic and/or colored markings at or in the representation of the machine control system 1. For example, a colored, in particular red frame around those operational ranges W1-Wn may be provided for which the emergency stop actuation element 8 is functionally available. Likewise, at the display 14 of the hand-held terminal 4, different colors may be used for distinguishing effectively associated operational ranges W1-Wn from ineffective, i.e. unassociated operational ranges W1-Wn.

Corresponding to the example according to FIG. 2, the emergency stop actuation element 8 of the hand-held terminal 4 is associated with the operational ranges W1, W2 and W3 and currently functionally available for these operational ranges. Consequently, a, for example, red frame is provided around the zones W1-W3, and the three discrete lighting means 23 with the markings W1, W2 and W3 light up. However, the lighting means 23 for the currently unassociated operational range W4 does not light up. The lighting means 23 marked with W5 may be provided for a different group of operational ranges. For example, the lighting means 23 marked with W6 may be activated if the emergency stop actuation element 8 is functionally associated with all operational ranges W1-W4 within the machine control system 1 represented on the display 14. Alternatively, in this case, the lighting means 23 marked with W1, W2, W3 and W4 may be active as well. In this regard, the respective type of graphical representation and also the respective lighting means-based type of representation at the hand-held terminal 4 are selected such that the operator may determine the operational range quickly and as unambiguously as possible. This may be achieved through a plurality of representation types on the display 14 in combination with adequate signalings by means of the lighting means 23; 24 at the housing 25 of the hand-held terminal 4.

According to an appropriate measure, the at least one lighting means 23 at the hand-held terminal 4 and/or the at least one discrete lighting means 24 in or at the at least one emergency stop actuation element 8 of the hand-held terminal 4 may be controlled by the electronic safety module 10 arranged in the hand-held terminal 4. In this regard, either the safety module 10 in the hand-held terminal 4 per se or in combination with the at least one external safety evaluation module 11—FIG. 1—may be configured as a so-called safety controller for meeting increased reliability and safety requirements.

In connection with increased functional safety or functional reliability, it may also be provided that the function according to plan, in particular the active and/or inactive state of the at least one lighting means 23; 24, is checked by means of the safety module 10 and at least one sensor 27 connected thereto, wherein a possible error state or a discrepancy in terms of evaluation is signaled, for example at the hand-held terminal 4. This way, at least the operator may be informed of an implausible state or a possible technical malfunction. The at least one sensor 27, by means of which functionality of the at least one lighting means 23; 24 and correctness of its control state (on/off) may be evaluated, may be formed by at least one sensor for measuring power consumption and/or by at least one sensor for measuring the brightness, for example. Fail-safety in terms of evaluation may—as illustrated in FIG. 3—be achieved by performing a so-called cross-comparison between the safety module 10 and the functional control device 5 of the hand-held terminal 4 and/or by evaluation by means of two processors or circuit arrangements and two evaluation routines.

According to a possible embodiment, the respective stopping category may be indicated by the at least one emergency stop actuation element 8 on the display 14 of the hand-held terminal 4. For example, the emergency stop actuation element 8 may be assigned to category 0 for immediate interruption of the energy supply with respect to the at least one machine operation, or to category 1 for stopping movements or functions with respect to the at least one machine operation and subsequent interruption of the energy supply. In this regard, the respective stopping category 0 or 1 may change or be modified depending on states of use of the hand-held terminal 4 or depending on operating states of the respective machine control 3, 3', as will be explained below.

In particular, a manually operable and/or automatically operating mode switching means 28 may be provided, for example a key switch or a user authorization means, by means of which a manually initiated or automatically executed change between a (i) stationary operating mode of the hand-held terminal 4 and a (ii) machine influencing mode of the hand-held terminal 4, in particular a so-called teach mode, and vice versa, may be carried out. Instead of a key switch, the mode switching means 28 may also comprise an interaction with a software-implemented authorization means, such as entering a PIN, or reading another authorization means. In particular, the mode switching means 28 may be influenced by interaction of the operator with at least one button at the hand-held terminal 4.

According to an embodiment, the at least one emergency stop actuation element 8 at the handheld terminal 4 may be operated or provided in the (i) stationary operating mode of the handheld terminal 4 as an emergency stop function element for immediate interruption of the energy supply with respect to the at least one machine operation. In contrast, the at least one emergency stop actuation element 8 at the hand-held terminal 4 may be operated or provided in the (ii) machine influencing mode of the hand-held terminal 4 for stopping movements or functions with respect to the at least one machine operation and for subsequent interruption of the energy supply.

According to a further measure, an appearance which is colored red at least in sections may be assigned to the at least one emergency stop actuation element 8 in the (i) stationary operating mode of the hand-held terminal 4 by activating the at least one lighting means 24—FIG. 3—, whereas the at least one lighting means 24 may be deactivated in the (ii) machine influencing or teach mode. In the machine influencing or teach mode, which is preferably only reserved for trained operators, the emergency stop actuation element 8 preferably does not have any red-colored portions. In this mode, the emergency stop actuation element 8 may have a predominantly gray appearance or a combined gray and yellow appearance. In particular, in the second operating mode, the emergency stop actuation element 8 may have a milky-gray transparent and yellow appearance.

According to an at least partially automated or fully automated embodiment, it may also be provided that the mode switching means is automatically influenced by depositing the handheld terminal 4 at a predefined location or by a predefined assignment to and/or attachment at a predefined counterpart, such as a wall mount, or that partially-automated or fully-automated switching between the two operating modes (i) and (ii)—and vice versa—is carried out.

The embodiments show possible variations; however, it should be noted at this point that the invention is not limited to its variations specifically shown; rather, various combinations of the individual variations are possible, and this variation possibility based on the technical teaching of the present invention is subject to the skills of the person skilled in the art active in this technical field.

The scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

As a matter of form, it should finally be noted that for better understanding of the structure, some of the elements have been represented unscaled and/or enlarged and/or in reduced size.

LIST OF REFERENCE NUMBERS

1 Machine control system
2, 2' Machine, industrial robot
3, 3' Machine controller
4 Hand-held terminal
5 Control device of the hand-held terminal
6, 6' Transmission interface
7 Storage battery
8 Emergency stop actuation element
9, 9' Emergency stop safety circuit
10 Safety module
11 Safety evaluation module
12 Operating element
13 Button
14 Display
15, 15' Radio counterpart
16 Connecting box
17 Control electronics
18, 18' Control core
19, 19' Further emergency stop actuation element
20 Radio-based operative connection
20' Cable connection
21, 21' Opener contact
22, 22' Safety bus system
23 Lighting means
24 Lighting means
25 Housing
26 7-segment display
27 Sensor
28 Mode switching means
W1-W4 Emergency stop operational ranges

The invention claimed is:

1. A method for operating a machine control system
having at least one machine controller for performing machine operations,
having at least one machine, which is controlled via a control mechanism by the at least one machine controller, and
having at least one mobile hand-held terminal, which is portable by an operator, for functionally influencing the at least one machine controller,
wherein the at least one mobile hand-held terminal has at least one operating element for manually influencing the at least one machine controller for performing the machine operations and at least one user interface having a display for monitoring or controlling the machine operations by an operator, and
wherein the at least one mobile hand-held terminal comprises at least one emergency stop actuation element for terminating the machine operations,
wherein respectively present actuation states of the at least one emergency stop actuation element may be manually activated or changed by an operator and are coupled via at least one transmission interface into an emergency stop safety circuit or into a safety bus system of the at least one machine controller,
the method comprising:
schematically or abstractly up to photorealistically representing the machine control system or portions of the machine control system on the display of the at least one mobile hand-held terminal;
schematically representing operational area(s) of the at least one emergency stop actuation element at the at least one mobile hand-held terminal using the display of the at least one mobile hand-held terminal and additionally using selective, fail-safe controlling of at least one lighting means at the at least one mobile hand-held terminal and/or at least one discrete lighting means in or at the at least one emergency stop actuation element at the at least one mobile hand-held terminal,
wherein for signaling the operational area(s) of the at least one emergency stop actuation element, the schematically represented portion of the machine control system is graphically marked and/or highlighted in color or those schematically represented portions of the machine control system are graphically marked and/or highlighted in color on the display of the at least one mobile hand-held terminal for which portion(s) the at least one emergency stop actuation element is functionally available.

2. The method according to claim 1, wherein for signaling the operational area(s) of the at least one emergency stop actuation element, fail-safe activation of the at least one lighting means is carried out to identify that portion of the machine control system the at least one emergency stop actuation element is functionally available.

3. A machine control system, wherein at least one machine controller and/or at least one mobile hand-held terminal and/or a control device of the at least one mobile hand-held terminal is adapted for implementing the method according to claim 2.

4. The method according to claim 1, wherein the at least one discrete lighting means in or at the at least one emergency stop actuation element is activated if the at least one emergency stop actuation element at the at least one mobile hand-held terminal is functionally available.

5. The method according to claim 1, wherein on the display of the at least one mobile hand-held terminal, the respectively applicable stopping category is additionally indicated by the at least one emergency stop actuation element, wherein the respectively applicable stopping category is selected from the group consisting of category 0 for immediate interruption of an energy supply with respect to the at least one machine operation, and category 1 for stopping movements or functions with respect to the at least one machine operation and subsequent interruption of the energy supply.

6. The method according to claim 5, further comprising a manually operable and/or automatically operating mode switching means configured to carry out a manually initiated or automatically executed change between a (i) stationary operating mode of the at least one mobile hand-held terminal and a (ii) machine influencing mode of the at least one mobile hand-held terminal, and vice versa.

7. The method according to claim 6, wherein the at least one emergency stop actuation element at the at least one mobile hand-held terminal is operated or provided in the (i) stationary operating mode of the at least one mobile hand-held terminal as an emergency stop function element for immediate interruption of the energy supply with respect to the at least one machine operation, and wherein the at least one emergency stop actuation element at the at least one mobile hand-held terminal is operated or provided in the (ii) machine influencing mode of the at least one mobile hand-held terminal for stopping movements or functions with respect to the at least one machine operation and for subsequent interruption of the energy supply.

8. The method according to claim 6, wherein an appearance which is colored red at least in sections is assigned to the at least one emergency stop actuation element in the (i) stationary operating mode of the at least one mobile hand-held terminal by activating the at least one discrete lighting means, whereas the at least one discrete lighting means is deactivated in the (ii) machine influencing mode.

9. The method according to claim 6, wherein the mode switching means is influenced by the operator interacting with at least one button on the at least one mobile hand-held terminal.

10. The method according to claim 6, wherein the mode switching means is automatically influenced by depositing the at least one mobile hand-held terminal at a predefined location or by a predefined assignment to and/or attachment at a predefined counterpart.

11. The method according to claim 1, wherein the at least one transmission interface of the at least one mobile hand-held terminal is wireless, and wherein the at least one wireless transmission interface is adapted for wirelessly establishing or implementing a control-related operative connection between the at least one mobile hand-held terminal and the at least one machine controller.

12. The method according to claim 11, wherein the respectively present actuation states of the at least one emergency stop actuation element, which actuation states may be manually activated or changed by the operator, are signaled via the at least one wireless transmission interface and coupled into the emergency stop safety circuit or into the safety bus system of the selected or actively connected machine controller, so that in an active operating state of the at least one mobile hand-held terminal, the at least one emergency stop actuation element may be coupled into the emergency stop safety circuit or into the safety bus system of the selected or actively connected machine controller in terms of function.

13. The method according to claim 1, wherein the at least one lighting means at the at least one mobile hand-held terminal and/or the at least one discrete lighting means in or at the at least one emergency stop actuation element of the at least one mobile hand-held terminal is controlled by an electronic safety module arranged in the at least one mobile hand-held terminal.

14. The method according to claim 13, wherein the function according to plan of the at least one lighting means at the at least one mobile hand-held terminal and/or the at least one discrete lighting means in or at the at least one emergency stop actuation element of the at least one mobile hand-held terminal is checked using the safety module and at least one sensor connected thereto, and a possible error state is signaled.

15. The method according to claim 1, wherein at least individual ones or all of the at least one lighting means at the at least one mobile hand-held terminal and the at least one discrete lighting means in or at the at least one emergency stop actuation element of the at least one mobile hand-held terminal are formed by at least one 7-segment display in a peripheral or edge region of the display and/or at the at least one emergency stop actuation element.

16. A machine control system for performing the method according to claim 1,
    having at least one machine controller for performing machine operations, having at least one machine, which is controllable via a control mechanism by the at least one machine controller, and
    having at least one mobile hand-held terminal, which is portable by an operator, for functionally influencing the at least one machine controller,
    wherein the at least one mobile hand-held terminal has at least one operating element for manually influencing the at least one machine controller for performing the machine operations and at least one user interface having a display for monitoring or controlling the machine operations by an operator, and
    wherein the at least one mobile hand-held terminal comprises at least one emergency stop actuation element for terminating the machine operations,
    wherein respectively present actuation states of the at least one emergency stop actuation element may be manually activated or changed by an operator and are coupled via at least one transmission interface into an emergency stop safety circuit or into a safety bus system of the at least one machine controller,
    wherein the at least one machine controller and/or the at least one mobile hand-held terminal is adapted for indicating a schematic representation of the machine control system or of portions of the machine control system on the display of the at least one mobile hand-held terminal, and
    wherein the at least one machine controller and/or the at least one mobile hand-held terminal is adapted for schematically or abstractly up to photorealistically representing the operational area(s) of the at least one emergency stop actuation element using the display of the at least one mobile hand-held terminal and additionally displaying said operational area(s) using selective, fail-safe controlling of at least one lighting means at the at least one mobile hand-held terminal and/or at least one discrete lighting means in or at the at least one emergency stop actuation element at the at least one mobile hand-held terminal, and wherein the at least one machine controller and/or the at least one mobile hand-held terminal is adapted, for signaling the operational area(s) of the at least one emergency stop actuation element, that schematically represented portion of the machine control system is graphically marked and/or highlighted in color or those schematically represented portions of the machine control system are graphically marked and/or highlighted in color on the display of the at least one mobile hand-held terminal for which portion(s) the at least one emergency stop actuation element is functionally available.

\* \* \* \* \*